Oct. 23, 1928.
J. F. O'CONNOR
1,688,649
SHOCK ABSORBER
Filed July 15, 1926
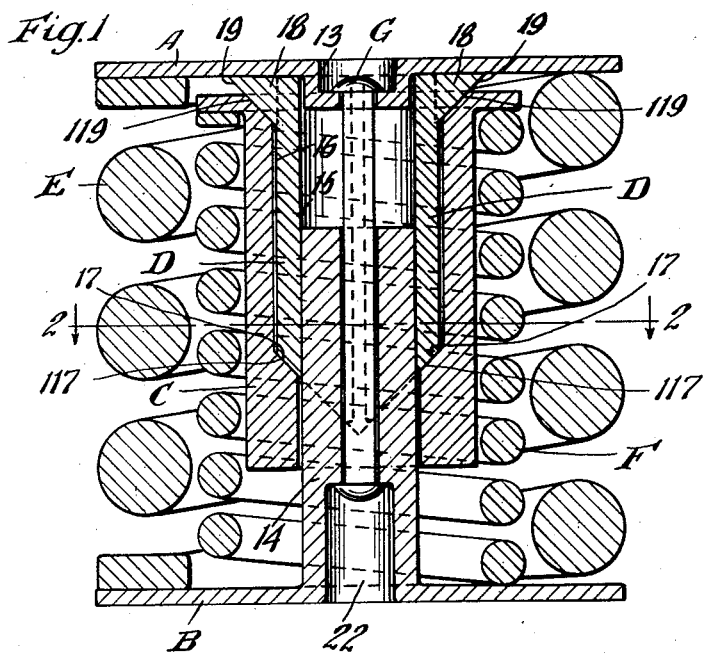
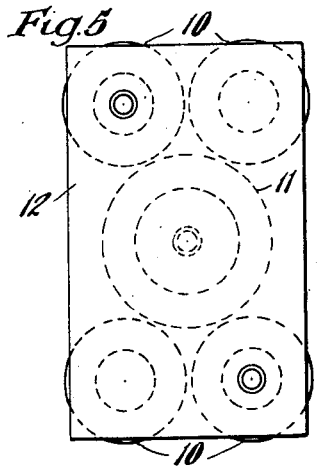
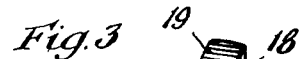
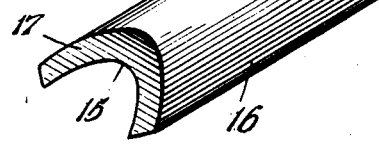
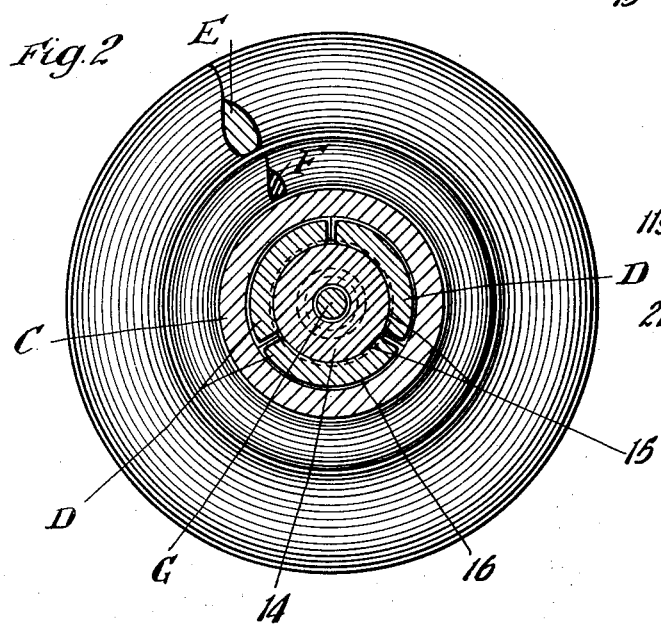
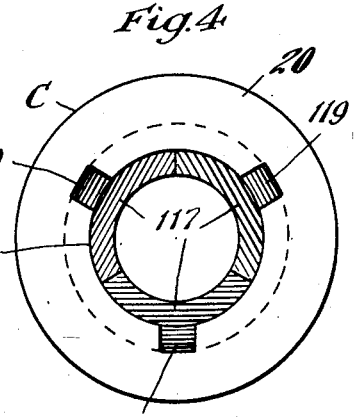
Witness
Wm. Geiger
Inventor
John F. O'Connor
By George I. Haight
His Atty.

Patented Oct. 23, 1928.

1,688,649

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK ABSORBER.

Application filed July 15, 1926. Serial No. 122,538.

This invention relates to improvements in shock absorbers.

One object of the invention is to provide a shock absorber of high capacity, especially adapted for railway car trucks.

Another object of the invention is to provide a shock absorber, including a friction unit adapted for use in connection with spring cushioning means for railway car trucks to provide a dampening means for the springs during compression of the latter to provide high capacity to absorb heavy shocks together with substantially free re-coil of the spring means.

A more specific object of the invention is to provide a shock absorbing means for railway car trucks with a friction means associated with a cluster of springs for augmenting the resistance offered by the springs.

Other objects and advantages of the invention will more fully and clearly appear from the description and claims hereinafter following.

In the drawing, forming a part of this specification, Figure 1 is a vertical, sectional view through a shock absorbing unit imbodying my invention. Figure 2 is a horizontal sectional view corresponding substantially to the line 2—2 of Figure 1. Figure 3 is a detailed perspective view of a friction shoe employed in connection with my improved mechanism. Figure 4 is a horizontal sectional view corresponding substantially to the line 4—4 of Figure 1. And Figure 5 is a diagrammatic plan view of a spring cluster associated with a car truck illustrating my improvements in connection therewith. In said drawings, referring first to Figure 5, 10 indicates a spring cushioning means comprising a cluster of four outer spring coils and a central combined spring and friction unit 11. The five units of the cluster are associated with the usual spring follower plates, one of which is shown and designated by 12. As is common in devices of this kind, the springs co-operate with top and bottom spring follower plates, the top spring follower plate bearing on the lower side of the usual truck bolster and the bottom spring follower plate bearing on top of the spring plank which in turn co-operates with the side frames of the truck.

My improved shock absorbing unit proper, which is associated with the cluster of springs, comprises broadly: Top and bottom spring follower members A and B; a hollow wedge member C; three friction shoes D—D—D; a spring resistance element comprising an outer coil E and an inner coil F; and a retainer rod G.

The top follower member A is in the form of a flat plate having a centrally disposed hollow boss 13 downwardly projecting therefrom. The bottom follower plate B comprises a flat plate-like section and a centrally disposed upstanding cylindrical post 14 presenting an outer cylindrical friction surface which co-operates with the friction shoes.

The friction shoes D are three in number, and cooperate with the friction post 14. The shoes D are arranged in annular series around the friction post, each shoe having a concave longitudinally disposed interior friction surface 15 cooperating with the friction surface of the post and an outer longitudinally disposed convex surface 16 spaced slightly from the inner surface of the hollow wedge member C. The three shoes are of identical design, each having a flat wedge face 17 at the lower end thereof. As most clearly shown in Figure 1, the wedge faces 17 are inclined inwardly and downwardly. Adjacent the upper end, each shoe is provided with a relatively short, centrally disposed lug 18 having a wedge face 19 on the lower side thereof. The upper end of each of the shoes presents a flat face which bears directly on the bottom face of the plate A.

The wedge member C is in the form of a hollow cylinder having an annular flange 20 at the upper end thereof. The flange 20 projects outwardly from the cylinder and forms an abutment for the upper end of the inner coil F of the spring resistance. The opposite end of the inner coil F of the spring resistance bears on the upper surface of the lower follower plate B. The wedge member C is provided with a substantially cylindrical opening 21 adapted to accommodate the three friction shoes D. At the upper end, the hollow wedge member is provided with three interior wedge faces 119—119 adapted to co-operate with the wedge faces 19 at the upper ends of the friction shoes. The wedge member C is also provided with three interior flat wedge faces 117 at the lower end of the opening 21 which co-operate with the wedge faces 17 of the three friction shoes.

The spring resistance which comprises a relatively heavy outer coil E, and a lighter inner coil F, is interposed between the followers A and B and surrounds the friction system comprising the post 14, the friction shoes D and the wedge cylinder C. The spring E has its opposite ends bearing directly on the top and bottom follower plates A and B, and the smaller spring F has its upper end bearing on the flange 20 of the wedge C and its lower end bearing on the upper face of the spring follower plate B.

The retainer rod G is anchored to the upper spring follower plate A and the lower spring follower plate B, the rod being provided with headed ends, one of the heads being accommodated within the hollow boss 13 of the plate A and the other head being accommodated within an opening 22 provided in the lower end of the post 14. It will be evident that the retainer rod holds the unit assembled and of overall uniform length. In this connection, it is pointed out that the upper end of the wedge cylinder C is normally spaced a slight distance from the lower face of the upper spring follower plate A, thus providing for compensation for wear of the various friction and wedge faces of the mechanism, the spring F being under initial compression so that the same expands as the different surfaces wear and forces the cylinder C upwardly.

Although my improvements are herein shown as forming a member of a spring cluster of a car truck, it will be evident that the same may be employed in other connections where shocks are to be absorbed.

In my improvements, the shock absorbing unit illustrated in Figure 1 replaces the usual central spring of a cluster of five springs employed in connection with a car truck.

The operation of my improved shock absorbing unit is as follows: When the truck bolster and the spring plank move relatively to each other, the springs of the spring cluster will be compressed. During the approach of the parts, the spring followers A and B will also be moved relatively toward each other, thereby compressing the spring E and also forcing the friction shoes to move relatively to the friction post 14. Inasmuch as the spring F resists movement of the wedge cylinder C, a wedging action will be set up between the wedge C and the friction shoes, thereby pressing the shoes into intimate contact with the friction surface of the post 14. Due to the friction between the post and the shoes, the resistance offered will be greatly augmented. It will be evident that a spring device, including the spring friction unit illustrated in Figure 1, will have much greater capacity than the usual arrangement of five springs in a cluster. Compression of the device is limited by engagement of the upper end of the post 14 with the follower plate A, and by engagement of the lower end of the cylinder C with the bottom follower B, thereby limiting the compression of the springs.

When the shock has been absorbed, the spring E, together with the outer four springs 10 of the cluster, are free to return the parts to their normal position. No resistance is offered during the re-coil of the springs by the friction elements. The spring F returns the friction elements to the normal position illustrated in Figure 1.

From the preceding description taken in connection with the drawings, it will be evident that I have provided a shock absorbing or cushioning means of exceptionally high capacity which greatly exceeds the usual spring arrangement employed in connection with car trucks and which also meets the restrictions as to the space which may be occupied by the springs. By my improvements, breakage of the springs which is common under the present service conditions of larger cars and increased load carrying capacity per car, is practically entirely eliminated, and further the danger of the cushioning device not affording sufficient capacity to carry the relatively heavy loads which are now common is entirely overcome. With spring devices of the old type, it is a common occurrence that the springs are compressed to such an extent when the car is fully loaded that they afford very little or no cushioning effect at all.

While I have herein shown and described what I now consider the preferred manner of carrying out my invention, the same is merely illustrative, and I contemplate all changes and modifications that come within the scope of the claims appended hereto.

I claim:

1. In a shock absorber, the combination with follower elements relatively movable toward and away from each other; of a friction post carried by one of said followers; friction shoes co-operating with the post and movable with the other followers, said shoes and post being moved relatively to each other upon relative approach of said follower elements; spring means opposing relative movement of said follower elements; a wedge means engaged by said shoes and movable therewith toward the follower carrying the post; and additional spring resistance means interposed between said last named follower and the wedge means and yieldingly opposing movement of the wedge means.

2. In a shock absorber for railway cars, the combination with a pair of relatively movable followers; a friction member fixed with respect to one of said followers; friction shoes co-operating with said member, said shoes being actuated by the other follower; pressure transmitting means for forcing said shoes against said member, said pressure transmitting means being engaged by the shoes and forced toward the follower carrying the post; a spring resistance element opposing movement of said means and interposed between said last named followers and said means, and adapted to be compressed therebetween; and additional spring means opposing movement of said followers.

3. In a shock absorbing mechanism, the combination with relatively movable friction elements; of follower means respectively actuating said friction elements for effecting relative movement of said elements; spring means resisting relative movement of said follower means; means movable with one of said elements; means for forcing said elements into intimate frictional contact; and an additional spring resistance opposing movement of said last named means and adapted to be compressed between said means and one of said followers.

4. In a shock absorber for railway car trucks, the combination with a plurality of spring resistance elements, forming a spring cluster and including a centrally disposed spring element; relatively movable spring followers; a friction element fixed with respect to one of said spring followers; a plurality of friction shoes co-operating with said friction element, said shoes being movable with respect to said spring follower, said friction elements and shoes being disposed within the central spring element; wedge means having wedging engagement with the shoes and movable thereby toward said spring follower; and an additional spring resistance interposed between the wedge means and the spring follower having the friction element associated therewith.

5. In a shock absorber for railway car trucks, the combination with relatively movable followers and a plurality of spring resistance elements, forming a spring cluster interposed between said followers, said cluster including a centrally disposed spring element; of a friction post carried by one of said spring followers; friction shoes co-operating with the post and movable by the other follower; wedge means co-operating with the shoes; and spring means resisting movement of said wedge means and compressible between said wedge means and the spring follower carrying the friction post, said post, shoes, wedge means and spring means being disposed within the centrally disposed spring, and said last named spring opposing movement of said movement effecting means.

In witness that I claim the foregoing I have hereunto subscribed my name this 8th day of July, 1926.

JOHN F. O'CONNOR.